United States Patent
Kim

(10) Patent No.: US 11,635,896 B2
(45) Date of Patent: Apr. 25, 2023

(54) METHOD AND DATA STORAGE APPARATUS FOR REPLACEMENT OF INVALID DATA BLOCKS DUE TO DATA MIGRATION

(71) Applicant: SK hynix Inc., Gyeonggi-do (KR)

(72) Inventor: Hyun Tae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/357,074

(22) Filed: Jun. 24, 2021

(65) Prior Publication Data
US 2022/0236903 A1     Jul. 28, 2022

(30) Foreign Application Priority Data
Jan. 25, 2021   (KR) .................. 10-2021-0009977

(51) Int. Cl.
*G06F 3/06*   (2006.01)
(52) U.S. Cl.
CPC ............ *G06F 3/061* (2013.01); *G06F 3/0656* (2013.01); *G06F 3/0683* (2013.01)
(58) Field of Classification Search
CPC ...... G06F 3/061; G06F 3/0656; G06F 3/0683; G06F 3/0631; G06F 2212/7205
See application file for complete search history.

(56) References Cited

U.S. PATENT DOCUMENTS

| | | | | |
|---|---|---|---|---|
| 2006/0064556 A1* | 3/2006 | Aasheim | ............. | G06F 12/0246 711/E12.008 |
| 2009/0216944 A1* | 8/2009 | Gill | ...................... | G06F 12/0804 711/E12.019 |
| 2011/0022778 A1* | 1/2011 | Schibilla | ............. | G06F 12/0246 711/170 |
| 2014/0379973 A1* | 12/2014 | Feldman | ............. | G06F 12/0253 711/103 |
| 2017/0262215 A1* | 9/2017 | Banerjee | ............. | G06F 9/45558 |
| 2018/0300240 A1* | 10/2018 | Li | ........................ | G06F 11/1076 |
| 2019/0102083 A1* | 4/2019 | Dusija | ................... | G06F 3/0679 |

FOREIGN PATENT DOCUMENTS

KR   10-2013-0060791 A   6/2013
KR   10-2019-0083148 A   7/2019

* cited by examiner

*Primary Examiner* — Chie Yew
(74) *Attorney, Agent, or Firm* — IP & T Group LLP

(57) ABSTRACT

A data storage apparatus may include: a storage comprising a plurality of memory blocks; and a controller configured to: configure a write buffer pool by selecting a plurality of first memory blocks which are some of the plurality of memory blocks, manage remaining memory blocks except for the first memory blocks as second memory blocks, exclude one or more of the first memory blocks, whose data are migrated to the second memory blocks and add one or more of the second memory blocks to the write buffer pool.

19 Claims, 12 Drawing Sheets

METHOD AND DATA STORAGE APPARATUS FOR REPLACEMENT OF INVALID DATA BLOCKS DUE TO DATA MIGRATION

CROSS-REFERENCES TO RELATED APPLICATION

The present application claims priority under 35 U.S.C. § 119(a) to Korean application number 10-2021-0009977, filed on Jan. 25, 2021, which is incorporated herein by reference in its entirety.

BACKGROUND

1. Technical Field

Various embodiments of the present disclosure generally relate to a semiconductor integrated apparatus, and more particularly, to a data storage apparatus and an operation method thereof.

2. Related Art

A data storage apparatus performs a data input/output operation according to a request of a host device by using a volatile or nonvolatile memory device as a storage medium.

Examples of the data storage medium may include a storage device using a flash memory device. The development of technology for flash memory devices has increased the capacities of the flash memory devices and improved the price competitiveness of the flash memory devices. Therefore, a storage apparatus using a flash memory device is employed in not only a PC or mobile device but also a data center which handles large-volume data.

In order to compensate for a difference in operating speed between the host device and the data storage apparatus, research is being conducted on various techniques.

For example, data to be written may be buffered into a storage medium through a high-speed write operation, and then migrated into another region of the storage medium, for example, a user data region. For this operation, a write buffer region into which data are buffered at high speed needs to be efficiently managed.

SUMMARY

In an embodiment of the present disclosure, a data storage apparatus may include: a storage comprising a plurality of memory blocks; and a controller configured to: configure a write buffer pool by selecting a plurality of first memory blocks which are some of the plurality of memory blocks, manage remaining memory blocks except for the first memory blocks as second memory blocks, exclude one or more of the first memory blocks, whose data are migrated to the second memory blocks and add one or more of the second memory blocks to the write buffer pool.

In an embodiment of the present disclosure, a data storage apparatus may include: a storage comprising a plurality of memory blocks; and a controller configured to configure a write buffer pool by selecting a plurality of first memory blocks which are some of the plurality of memory blocks. The first memory blocks include at least one of a valid data block, an invalid data block and a free block. The controller is further configured to manage the write buffer pool to keep a number of the first memory blocks except for the invalid data blocks at a target level.

In an embodiment of the present disclosure, there is provided an operation method of a data storage apparatus which includes a storage including a plurality of memory blocks; and a controller configured to control the storage. The operation method may include the operations of: configuring, by the controller, a write buffer pool by selecting a plurality of first memory blocks which are some of the plurality of memory blocks; managing, by the controller, remaining memory blocks except for the first memory blocks as second memory blocks; migrating, by the controller, data stored in one or more of the first memory blocks to one or more of the second memory blocks; and excluding, by the controller, one or more of the first memory blocks, whose data were migrated adding one or more of the second memory blocks to the write buffer pool.

In an embodiment of the present disclosure, a data storage apparatus may include: a storage comprising a plurality of memory blocks; and a controller configured to: select a predetermined number of fee blocks from the memory blocks to configure a pool, remaining memory blocks other than the selected blocks being user data blocks, control the storage to buffer data into one or more of the selected blocks, control the storage to migrate the buffered data from the selected blocks into one or more of the user data blocks, and substitute the selected blocks, in which the buffered data become invalid due to the migration, with free blocks among the user data blocks.

In accordance with the embodiments of the present disclosure, the data storage apparatus and the operation method can synchronize a capacity of a logical write buffer managed by a controller with a capacity of a physical write buffer allocated within a storage medium, and easily manage the entire size by easily allocating and releasing a write buffer.

DETAILED DESCRIPTION

Hereinafter, a data storage apparatus and an operation method thereof according to the present disclosure will be described below with reference to the accompanying drawings through various embodiments.

Figure 1:
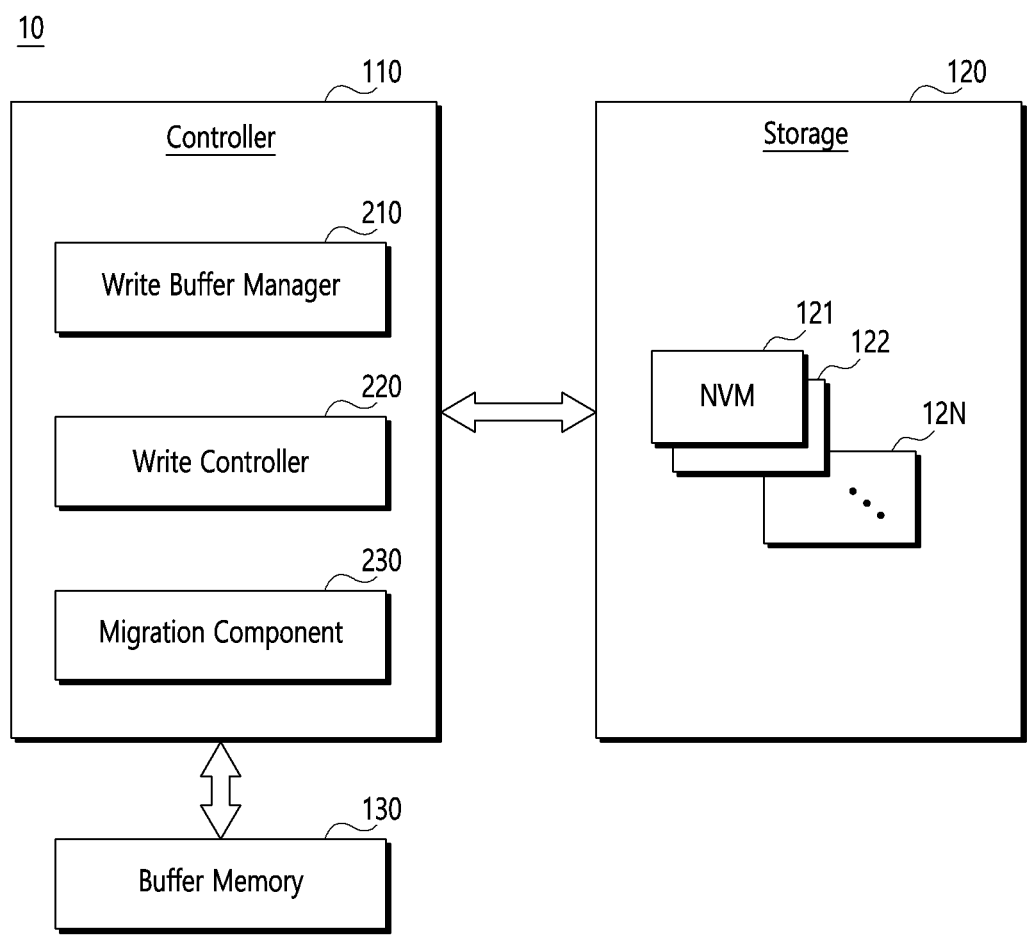
FIG. 1 is a configuration diagram illustrating a data storage apparatus in accordance with an embodiment of the present disclosure.

FIG. 1 is a configuration diagram illustrating a data storage apparatus in accordance with an embodiment of the present disclosure.

Referring to FIG. 1, a data storage apparatus 10 in accordance with an embodiment may include a controller 110, a storage 120, and a buffer memory 130.

The controller 110 may control the storage 120 in response to a request of a host device (not illustrated). For example, the controller 110 may control the storage 120 to program data according to a write request of the host device. Furthermore, the controller 110 may provide the host device with data stored in the storage 120 in response to a read request of the host device.

The storage 120 may program data or output the programmed data, under control of the controller 110. The storage 120 may be configured as a volatile memory device or nonvolatile memory device. In an embodiment, the storage 120 may be implemented as a memory device selected among various nonvolatile memory devices such as an EEPROM (Electrically Erasable and Programmable ROM), NAND flash memory, NOR flash memory, PRAM (Phase-Change RAM), ReRAM (Resistive RAM), FRAM (Ferroelectric RAM) and STT-MRAM (Spin Torque Transfer Magnetic RAM).

The storage 120 may include a plurality of nonvolatile memory devices (NVM) 121 to 12N, and each of the nonvolatile memory devices 121 to 12N may include a plurality of dies, a plurality of chips, or a plurality of packages. Each of the dies may include one or more planes, and each of the planes may be constituted by a plurality of memory blocks. Each of the memory blocks may include a plurality of pages. The detailed descriptions thereof will be described below with reference to FIG. 3.

The storage 120 may operate as an SLC (Single-Level Cell) capable of storing 1-bit data therein or an XLC (Extra-Level Cell) capable of storing multi-bit data therein. A memory cell operating as an SLC can perform a write or read operation at higher speed than a memory cell operating as an XLC.

The buffer memory 130 serves as a space capable of temporarily storing data which are transmitted/received when the data storage apparatus 10 performs a series of operations of writing or reading data while interworking with the host device. FIG. 1 illustrates that the buffer memory 130 is located outside the controller 110, but the buffer memory 130 may be located inside the controller 110. The buffer memory 130 may be controlled by a buffer manager (not illustrated).

The controller 110 may include a write buffer manager 210, a write controller 220, and a migration component 230.

The write buffer manager 210 may configure, as a write buffer pool, a part of a storage region constituting the storage 120, for example, a plurality of memory blocks. In an embodiment, data may be stored in the memory blocks constituting the write buffer pool, according to the SLC mode. The write buffer manager 210 may configure the write buffer pool by considering the entire capacity of the storage 120, the capacity of a unit memory block, the allowed capacity of the write buffer pool and the like or configure the write buffer pool to satisfy a capacity requested by the host device.

The other memory blocks except the memory blocks constituting the write buffer pool may be used as the user data region. For example, data may be stored to the user data area according to the XLC mode, but the present embodiment is not limited thereto. As described below, one or more memory blocks operating in the XLC mode within the user data area may be added to the write buffer pool (for example, refer to FIG. 5E). In this case, the memory blocks added to the write buffer pool may be capable of operating in the SLC mode.

As write data is stored (primarily buffered) in the buffer memory 130 in response to a write request of the host device, the write buffer manager 210 may allocate for the primarily buffered write data at least some of the memory blocks constituting the write buffer pool.

In an embodiment, the write buffer manager 210 may select a memory block which is to be allocated to store write data within the write buffer pool, according to a NAP (Next Allocation Pointer) based on a wrap around method. As the NAP is used, the write buffer manager 210 may easily manage the list of the memory blocks constituting the write buffer pool. For example, the write buffer manager 210 may simply select a memory block into which data is to be buffered, within the write buffer pool.

The write controller 220 may store (secondarily buffer) write data in the memory block allocated by the write buffer manager 210.

The migration component 230 may migrate the write data stored in a migration victim memory block within the write buffer pool, to the user data region of the storage 120. For this operation, the write buffer manager 210 may select a migration victim memory block according to an NFP (Next Free Pointer) based on the wrap around method. As the NFP is used, the write buffer manager 210 may easily manage the migration state of a memory block used as a write buffer.

The flash memory device cannot perform overwrite or in-place update. Therefore, the data of the memory block, migrated to the user data region by the migration component 230, may be invalid until the data is erased.

When the controller 110 recognizes that a block of the write buffer, corresponding to the size of the data migrated to the user data region has been returned after the migration operation, a difference may occur between the logical size and the physical size of the write buffer. That is because, since the invalid data is still stored in the memory block within the write buffer pool until the data is erased after the migration, the physical write buffer pool is not yet secured.

The write buffer manager 210 in accordance with the present embodiment may exclude a memory block from the write buffer pool, after data of the memory block pointed by the NFP is migrated, and add a free block, selected from the user data region, to the write buffer pool, thereby keeping the size of the write buffer pool at a target level. The size of the added memory block may correspond to the size of the memory block whose data has been migrated.

As such, the storage 120 in accordance with the present embodiment may include a plurality of memory blocks.

From a logical point of view, the plurality of memory blocks may include a first storage region and a second storage region. The first storage region may include a plurality of first memory blocks to which data is written at high speed or each of which is configured to store 1-bit data therein, and the second storage region may include a plurality of second memory blocks to which data is written at slower speed than in the first storage region, or each of which is configured to store 2 or more-bit data therein.

The controller 110 may configure, as a write buffer pool, the first memory blocks which are some of the plurality of memory blocks included in the first storage region. When at least one first memory blocks included in the write buffer pool is released through a migration operation, for example, the controller 110 may add to the write buffer pool, at least one of the second memory blocks corresponding to the other memory blocks which are not included in the write buffer pool.

Due to the write operation of storing data into the first memory blocks, the first memory blocks constituting the write buffer pool may include one or more of a valid data block, an invalid data block, and a free block ready to store data. The invalid data block may be a first memory block, which stores invalid data due to the operation of migrating data from the first memory block into the second memory block. During the migration operation, the first memory block may be the migration victim memory block and the second memory block may be a migration target memory block. As a result of the migration operation, the data stored in the first memory block becomes invalid and the first memory block becomes the invalid data block. Except for the invalid data block, the controller 110 may manage the write buffer pool to keep a number of the first memory blocks substantially constant in the write buffer pool.

Figure 2:
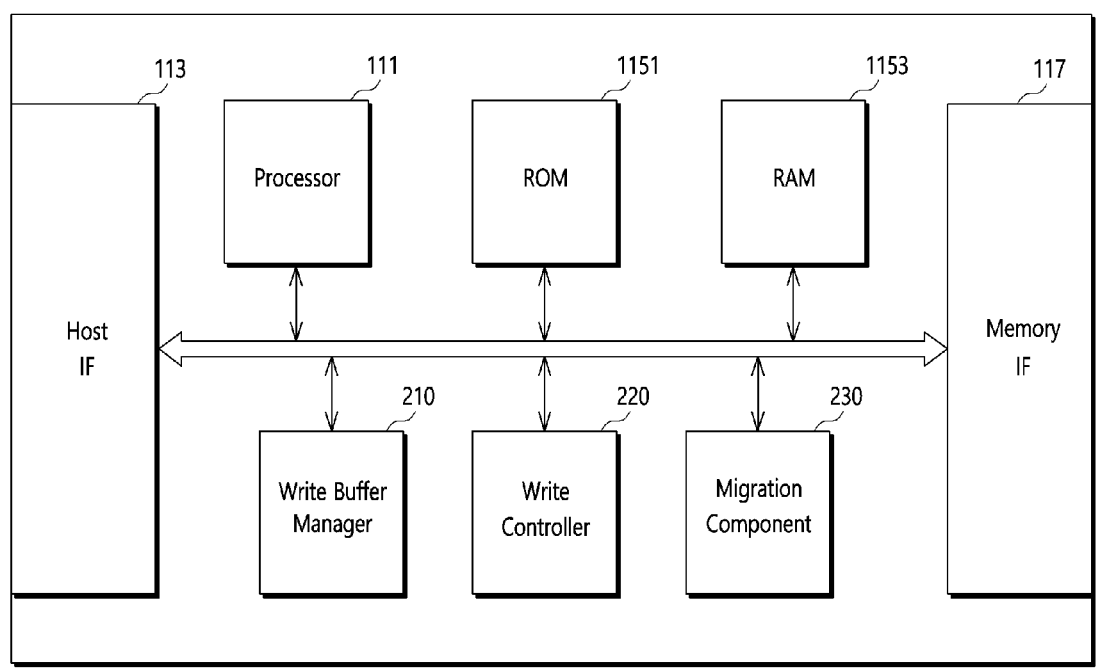
FIG. 2 is a configuration diagram illustrating a controller in accordance with an embodiment of the present disclosure.

FIG. 2 is a configuration diagram illustrating the controller in accordance with the present embodiment of the present disclosure.

Referring to FIG. 2, the controller 110 in accordance with the present embodiment may include a processor 111, a host interface 113, a ROM 1151, a RAM 1153, a memory interface 117, the write buffer manager 210, the write controller 220 and the migration component 230.

The processor 111 may transfer various pieces of control information to other components including the host interface 113, the RAM 1153, the buffer manager and the memory interface 117, the various pieces of control information being required for a data read or write operation on the storage 120. In an embodiment, the processor 111 may operate according to firmware provided for various operations of the data storage apparatus 10. In an embodiment, the processor 111 may perform a function of an FTL (Flash Translation Layer) for performing garbage collection, address mapping, or wear leveling to manage the storage 120, and a function of detecting and correcting an error of data read from the storage 120.

The host interface 113 may provide a communication channel for receiving a command and clock signal from the host device and controlling data input/output, under control of the processor 111. In particular, the host interface 113 may provide a physical connection between the host device and the data storage apparatus 10. Furthermore, the host interface 113 may provide an interface with the data storage apparatus 10 in response to the bus format of the host device. For example, the bus format of the host device may include one or more of standard communication interfaces or protocols such as SD (Secure Digital), USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage).

The ROM 1151 may store program codes required for an operation of the controller 110, for example, firmware or software, and store code data used by the program codes.

The RAM 1153 may store data required for the operation of the controller 110 or data generated by the controller 110.

The memory interface 117 may provide a communication channel for transmitting/receiving signals between the controller 110 and the storage 120. The memory interface 117 may write data temporarily stored in the buffer memory 130, to the storage 120 under control of the processor 111. Furthermore, the memory interface 117 may transfer data read from the storage 120, to the buffer memory 130 to temporarily store the read data.

The write buffer manager 210 may configure, as a write buffer pool, a part of a storage region constituting the storage 120, for example, a plurality of memory blocks. The memory blocks constituting the write buffer pool may operate in a high-speed access manner to store 1-bit data per cell. At least some of the other memory blocks of the storage 120 may be used as the user data region.

The write buffer manager 210 may allocate for the primarily buffered write data at least some of the memory blocks constituting the write buffer pool in response to a write request of the host device. As data of a migration victim memory block within the write buffer pool is migrated to a migration target memory block within the user data region, the write buffer manager 210 may release or exclude the migration victim memory block, which becomes an invalid data block due to the migration operation, from the write buffer pool.

The write controller 220 may store write data in the memory block within the write buffer pool, allocated by the write buffer manager 210.

The migration component 230 may migrate the write data, stored in the migration victim memory block within the write buffer pool, to a migration target memory block within the user data region of the storage 120.

In an embodiment, the write buffer manager 210 may select a memory block within the write buffer pool, which is to be allocated to store write data, according to a NAP based on the wrap around method. The write buffer manager 210 may select a migration victim memory block according to an NFP based on the wrap around method.

Furthermore, the write buffer manager 210 may add a number of memory blocks, corresponding to the number or size of migrated memory blocks which become invalid data blocks and are released from the write buffer pool after the migration operation, to the write buffer pool, thereby keeping the size of the write buffer pool at the target level.

Figure 3:
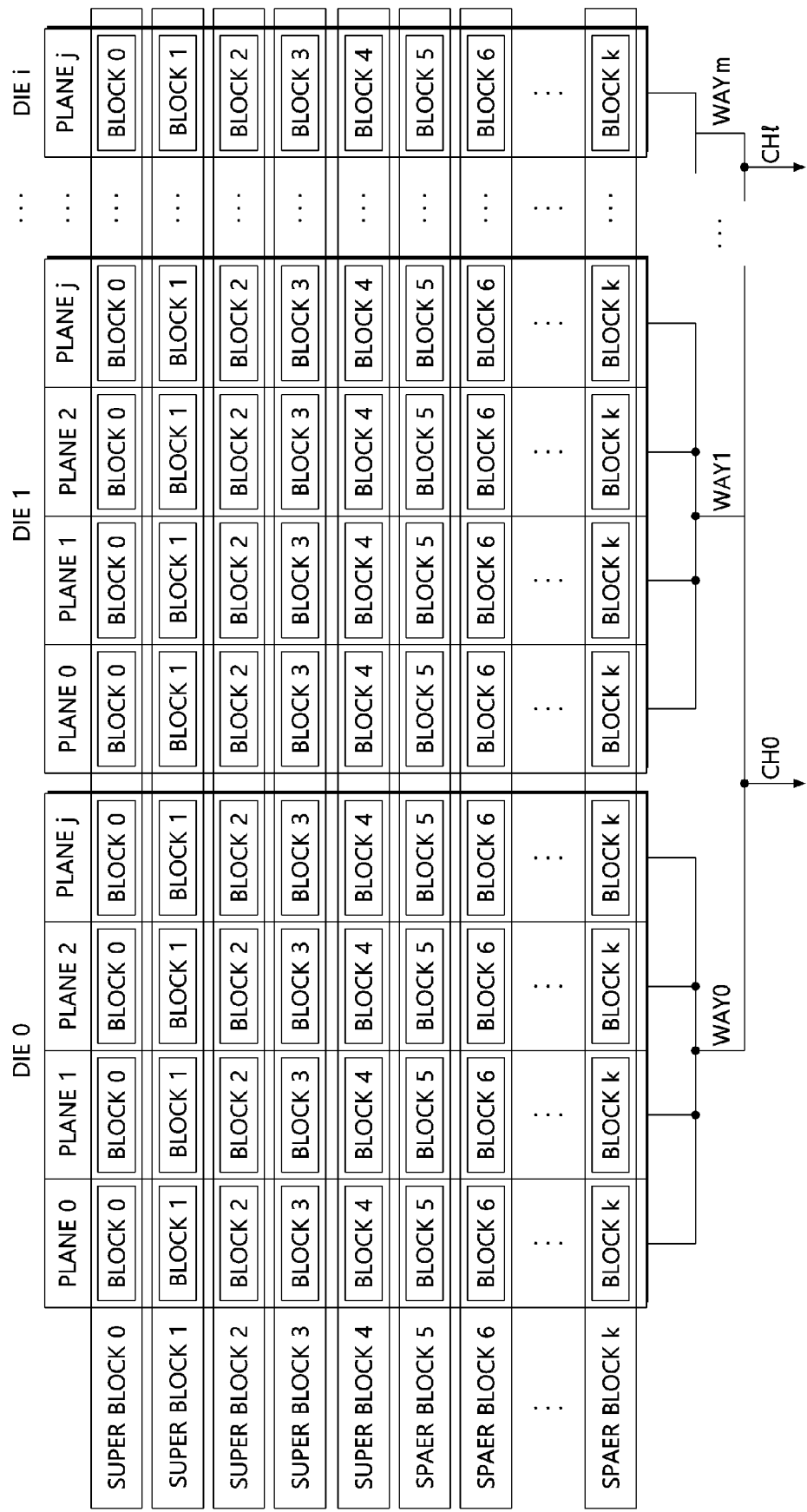
FIG. 3 is a configuration diagram illustrating a storage in accordance with an embodiment of the present disclosure.

FIG. 3 is a configuration diagram illustrating the storage in accordance with the present embodiment of the present disclosure.

Referring to FIG. 3, the storage 120 may include a plurality of dies DIE0 to DIEi. Each of the dies DIE0 to DIEi may include a plurality of planes PLANE0 to PLANEj. The controller 110 may configure block groups SUPER BLOCK0 to SUPER BLOCKk by selecting and grouping blocks at the same positions or different positions in the respective planes PLANE0 to PLANEj. For example, memory blocks included in one block group may be selected substantially at the same time through a die interleaving method.

The plurality of planes (PLANE0 to PLANEj)*i included in the plurality of memory dies DIE0 to DIEi may input/output data through I channels CH0 to CHI and m ways WAY0 to WAYm. FIG. 3 illustrates that one channel is shared by VI ways and one way is shared by j planes.

The controller 110 may configure a write buffer pool by selecting at least some of the memory blocks constituting the storage 120 or at least some of the block groups.

Therefore, the memory blocks within the write buffer pool may be interpreted as having various meanings such as a block group or single blocks which are not grouped.

Figure 4:
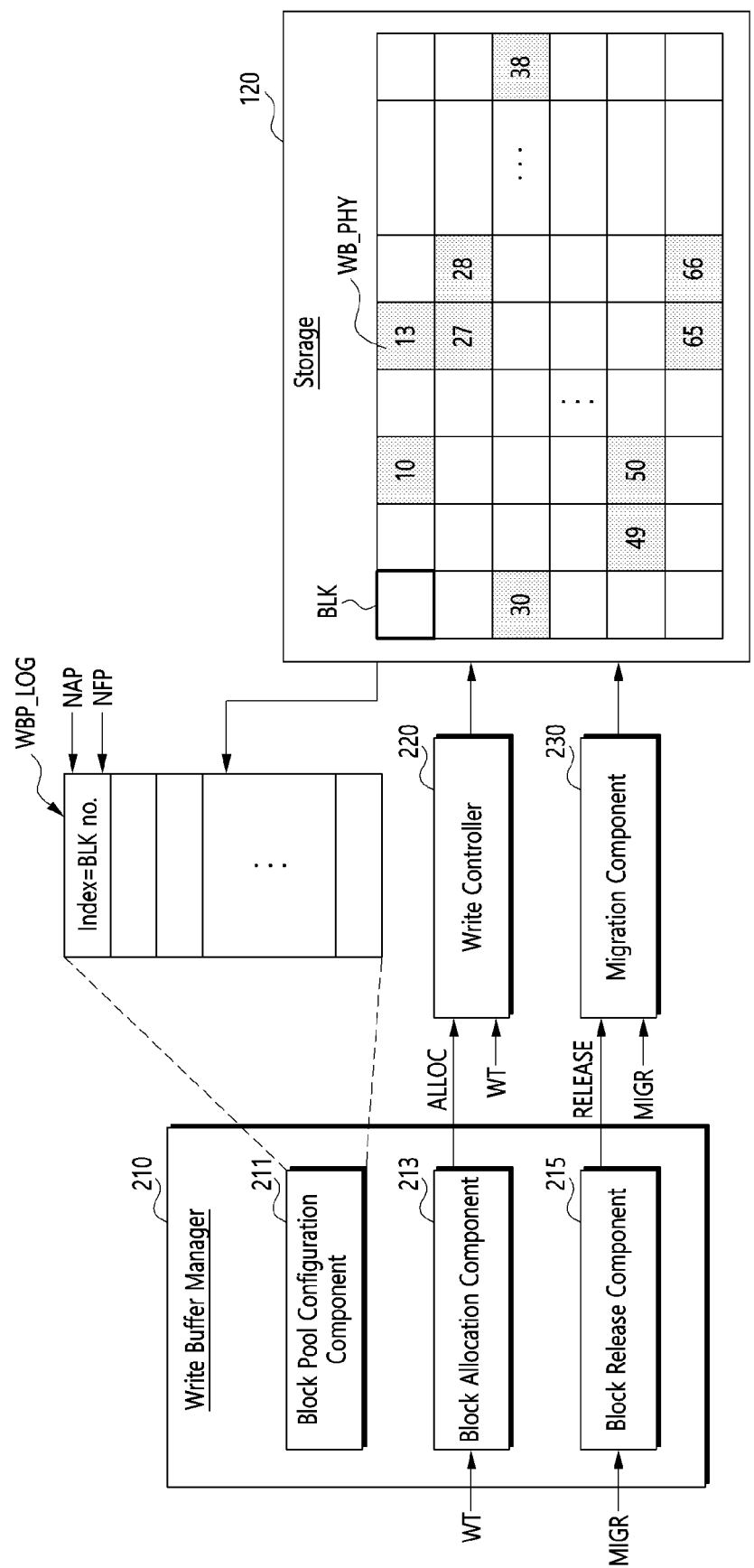
FIG. 4 is a conceptual view for describing an operation of the data storage apparatus in accordance with an embodiment of the present disclosure.

FIG. 4 is a conceptual view for describing an operation of the data storage apparatus in accordance with the present embodiment of the present disclosure.

Referring to FIG. 4, the write buffer manager 210 may include a block pool configuration component 211, a block allocation component 213, and a block release component 215.

The block pool configuration component 211 may configure a logical write buffer pool WBP_LOG by selecting some of a plurality of blocks BLK included in the storage 120, as physical write buffers WB_PHY. Each of the memory blocks constituting the logical write buffer pool WBP_LOG may be managed through a physical block address BLK no. as an index Index.

When the write buffer pool WBP_LOG is configured, the block pool configuration component 211 may select a memory block which is to be allocated to store write data within the write buffer pool WBP_LOG, according to a NAP based on the wrap around method.

When the write data is stored (primarily buffered) into the buffer memory 130 in response to a write request WT of the host device, the block allocation component 213 may allocate for the primarily buffered write data one or more memory blocks constituting the write buffer pool WBP_LOG by referring to the size of the write data, the size of a unit memory block and the NAP, and output block allocation information ALLOC.

The write controller 220 may store the write data, primarily buffered in the buffer memory 130, into the allocated write buffer in response to the block allocation information ALLOC and the write request WT. Specifically, the write controller 220 may secondarily buffer write data into a physical write buffer WB_PHY corresponding to an allocated logical write buffer in the logical write buffer pool WBP_LOG. After the write data is stored in one or more allocated memory blocks including a memory block pointed to by the NAP, the block pool configuration component 211 may change the NAP to point to a free memory block other than the allocated memory blocks within the write buffer pool.

The block release component 215 may select a release target memory block, which is to be released or excluded from the write buffer pool WBP_LOG, according to an NFP based on the wrap around method. As a migration event MIGR occurs such that data is migrated from a currently allocated write buffer or a migration victim memory block to a second memory block or a migration target memory block of the user data region, the block release component 215 may output, by referring to the NFP, block release information RELEASE including the address of the migration victim memory block which is a victim of the migration event MIGR and will become an invalid data block which is to be released (excluded) from the write buffer pool WBP_LOG.

When the block release information RELEASE is provided by the block release component 215 after the migration event MIGR occurred, the migration component 230 may migrate data of the write buffer memory block which is to be released, to the user data region. After the data is migrated, the block release component 215 may change the NFP to point a memory block having valid data stored therein within the write buffer pool.

In an embodiment, the migration event may be triggered when a request of the host device is not generated for a preset time or when the data storage apparatus 10 enters a predefined mode such as hibernation. However, the present embodiment is not limited thereto.

In order to compensate for the size of the write buffer pool, which has been reduced due to the migration operation, the block pool configuration component 211 may add a memory block having a size of the memory block whose data has been migrated, to the write buffer pool WBP_LOG, thereby keeping the size of the write buffer pool WBP_LOG at the target level.

FIGS. 5A to 5F are conceptual views for describing a write buffer management method in accordance with an embodiment of the present disclosure.

In FIGS. 5A to 5F, an allocated block indicates a block constituting a write buffer pool which is now storing valid data. A free block indicates a block constituting a write buffer pool which is ready to store data. A released block indicates a block storing invalid data due to a migration operation among the allocated blocks and which has been released or excluded from the write buffer pool.

Figure 5A:
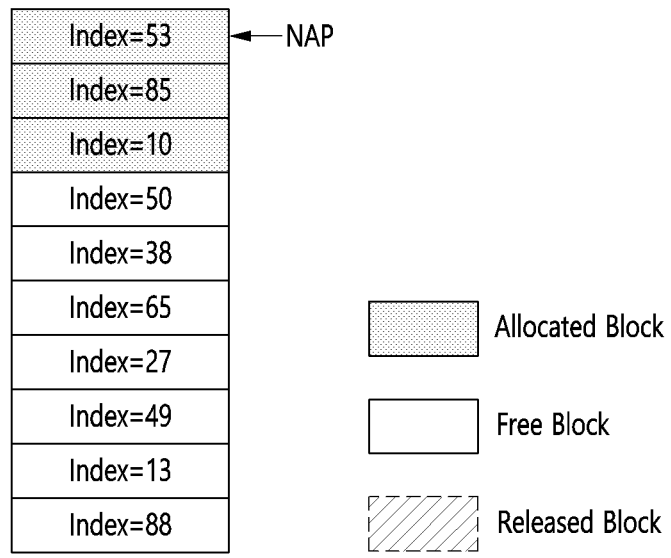
FIG. 5A to 5F are is a conceptual view for describing a write buffer management method in accordance with an embodiment of the present disclosure.

FIG. 5A illustrates that the controller 110 configured a write buffer pool by selecting 10 memory blocks whose indexes are 53, 85, 10, 50, 38, 65, 27, 49, 13 and 88 and an NAP points the first memory block of the index 53 among the 10 memory blocks whose indexes are 53, 85, 10, 50, 38, 65, 27, 49, 13 and 88.

Figure 5B:
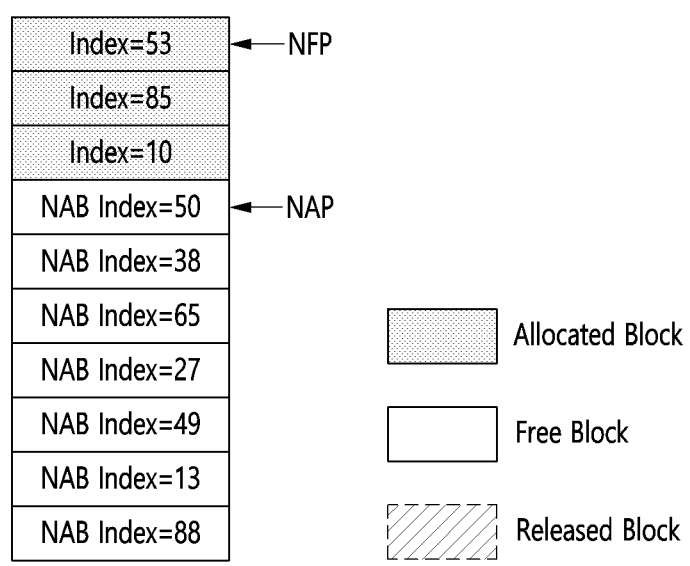

In this state, when the host device transfers a write request for data corresponding to the size of three memory blocks, the data may be stored in the first three memory blocks whose indexes are 53, 85 and 10 among the 10 memory blocks whose indexes are 53, 85, 10, 50, 38, 65, 27, 49, 13 and 88. The three memory blocks whose indexes are 53, 85 and 10 are now the allocated blocks. When the data are stored in the allocated blocks within the write buffer pool, the NAP may be moved to point to the memory block whose index is 50, as illustrated in FIG. 5B. The memory block having the index 50 is a free block next to the allocated blocks of indexes 53, 85 and 10. Furthermore, the NFP may point to the first memory block whose index is 53 among the allocated blocks whose indexes are 53, 85 and 10.

Figure 5C:
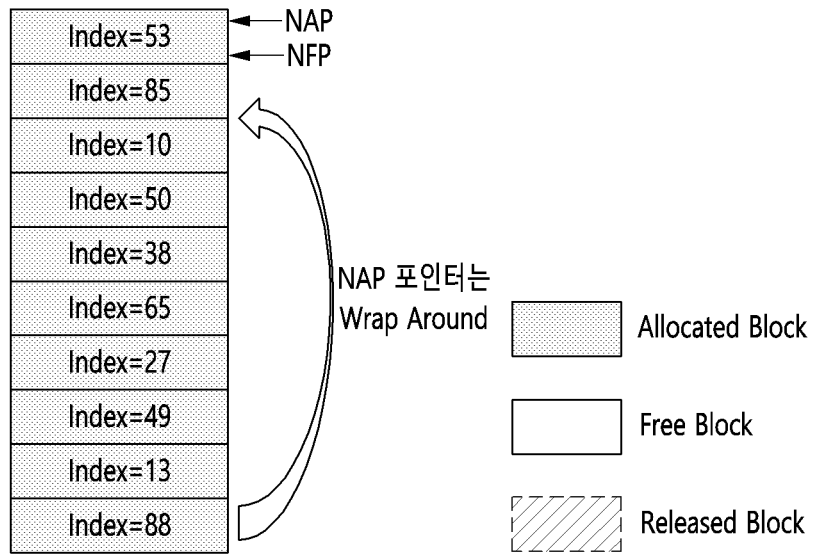

As write requests of the host device are continuously processed, the memory blocks constituting the write buffer pool may be all allocated as illustrated in FIG. 5C. When no migration event occurs, write data after the write buffer pool is full may be directly stored in the user data region without passing through the write buffer pool, which is now full of data.

Figure 5D:
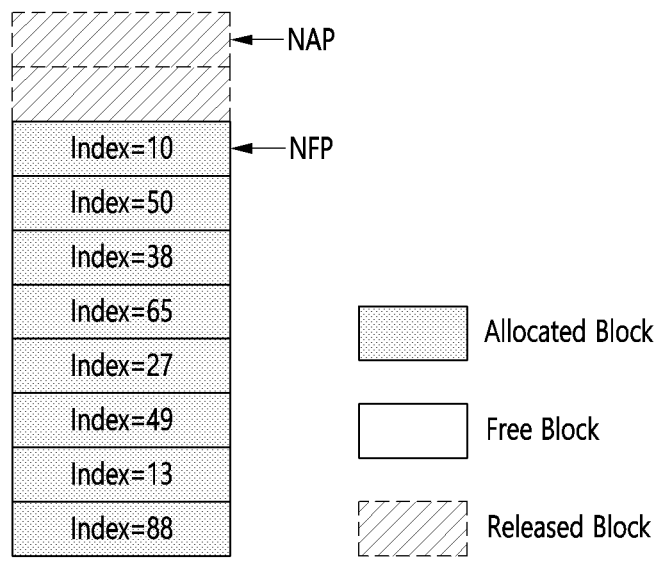

When a migration event occurs, write data stored in a set number of the allocated blocks, for example, two allocated blocks of the indexes 53 and 85, may be migrated to the user data region, based on the NFP. Thus, as illustrated in FIG. 5D, the allocated blocks of the indexes 53 and 85 may be excluded from the write buffer pool to become the released blocks. Then, the NFP may be changed to point to the allocated block of the index 10 next to the released blocks of the indexes 53 and 85.

Figure 5E:
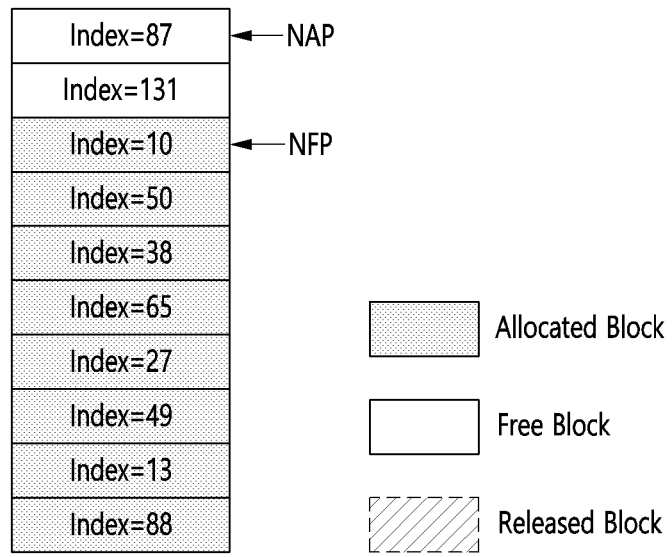

As illustrated in FIG. 5E, the controller 110 may add new free blocks having indexes 87 and 131 from the user data area to the write buffer pool, in order to keep the capacity of the write buffer pool at the target level. The free blocks having indexes 87 and 131 may operate in the XLC mode when the free blocks are included in the user data area and may be capable of operating in the SLC mode when the free blocks are added to the write buffer pool. Since the new free blocks of indexes 87 and 131 are added to the write buffer pool, the NAP may be changed to point to the first index 87 between the added free blocks indexes 87 and 131.

While the write buffer pool is operated in the above-described way, a Current Buffer Size (CBS) event may occur in the storage 120. For example, the size of the user data region may be reduced to a threshold value or less.

The write buffer manager 210 of the controller 110 may reduce the size of the write buffer pool by releasing at least some of free blocks within the write buffer pool such that the released free blocks become included in the user data region in response to the CBS event.

Figure 5F:
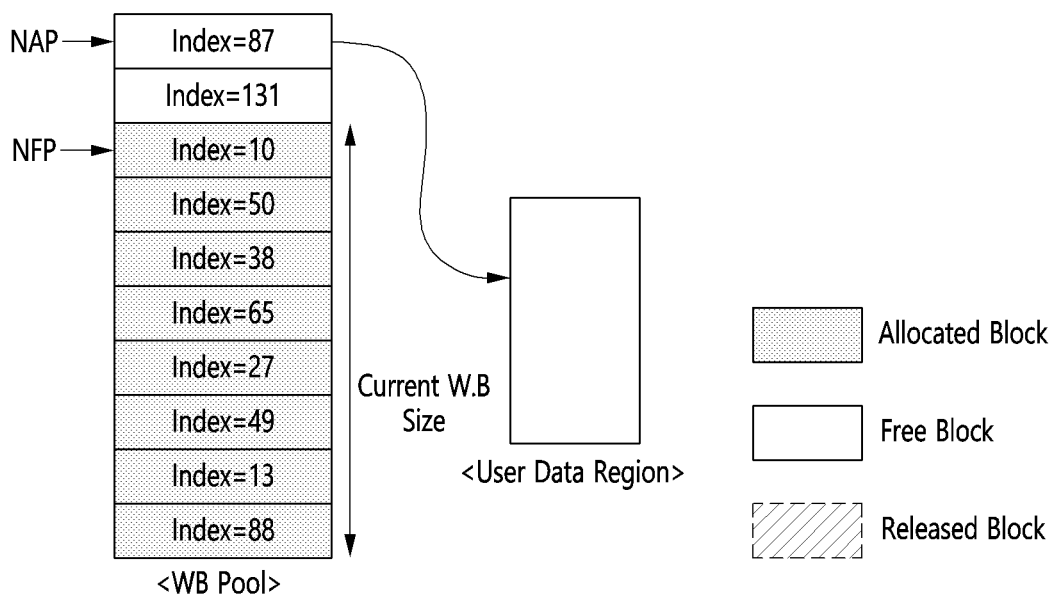

As illustrated in FIG. 5F, the controller 110 may release to the user data region two free blocks having indexes 87 and 131 among the memory blocks within the write buffer pool, thereby securing a space of the user data region. The memory blocks having indexes 87 and 131 may operate in the SLC mode when the memory blocks are included in the write buffer pool and may be capable of operating in the XLC mode when the memory blocks are released to the user data area.

The CBS event may be triggered to increase the write buffer size when the size of the user data region secured in the storage 120 exceeds the threshold value.

Figure 6:
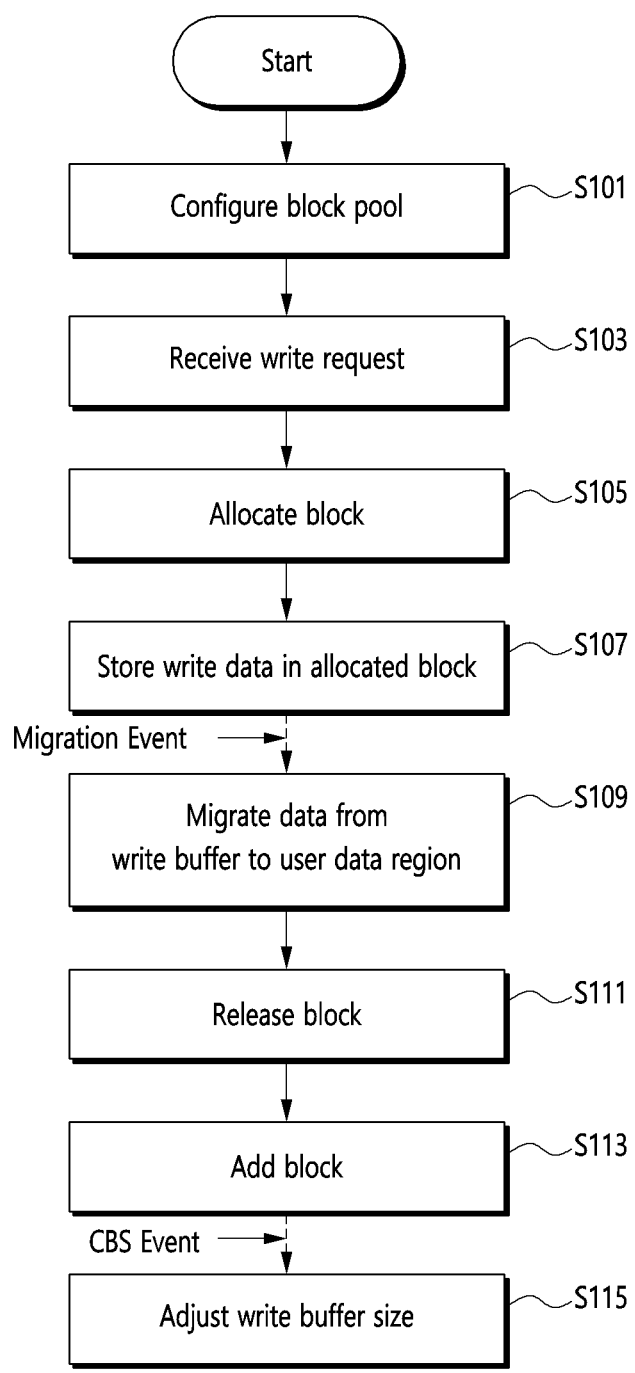
FIG. 6 is a flowchart illustrating an operation method of a data storage apparatus in accordance with an embodiment of the present disclosure.

FIG. 6 is a flowchart illustrating an operation method of a data storage apparatus in accordance with an embodiment of the present disclosure.

The write buffer manager 210 of the controller 110 may configure as a write buffer pool, a part of a storage region constituting the storage 120, for example, a plurality of memory blocks in an operation S101. In an embodiment, 1-bit data may be stored in each of the cells of the memory blocks constituting the write buffer pool. The write buffer manager 210 may configure the write buffer pool, in consideration of the entire capacity of the storage 120, the capacity of a unit memory block, the allowed capacity of the write buffer pool and the like. Furthermore, the controller 110 may select a memory block within the write buffer pool, which is to be allocated to store write data, as a NAP based on the wrap around method. At least some of the other memory blocks except the memory blocks constituting the write buffer pool may be the user data region.

As write data is stored (primarily buffered) in the buffer memory 130 in response to a write request of the host device in an operation S103, the controller 110 may allocate for the primarily buffered write data at least some of the memory blocks constituting the write buffer pool, based on the size of the write data and the NAP, in an operation S105.

As the write buffer is allocated, the controller 110 may store (secondarily buffer) the write data to a memory block within the allocated write buffer in an operation S107. Furthermore, the controller 110 may change the NAP to point the next memory block to be allocated. Furthermore, an NFP may be set to point the memory block in which the write buffer is buffered.

When a request of the host device is not generated for a preset time or when the data storage apparatus 10 enters a preset mode such as hibernation, a migration event may occur. Based on the migration event and the NFP, the controller 110 may migrate write data, stored in a preset number of memory blocks, to the user data region in an operation S109. Thus, the memory blocks, from which the write data have been migrated, are excluded from the write buffer pool in S111. Then, the NFP may be changed to point the next release target memory block.

In order to compensate for the size of the write buffer pool, which has been reduced through the migration operation, the controller 110 may add a memory block having a size of the memory block whose data has been migrated, to the write buffer pool WBP_LOG, thereby keeping the size of the write buffer pool WBP_LOG at a target level, in an operation S113.

A CBS event may occur while the size of the user data region in the storage 120 is reduced to a threshold value or less. The controller 110 may adjust the size of the write buffer pool by releasing at least some of the free blocks within the write buffer pool such that the released free blocks become included in the user data region in response to the CBS event, in an operation S115.

Figure 7:
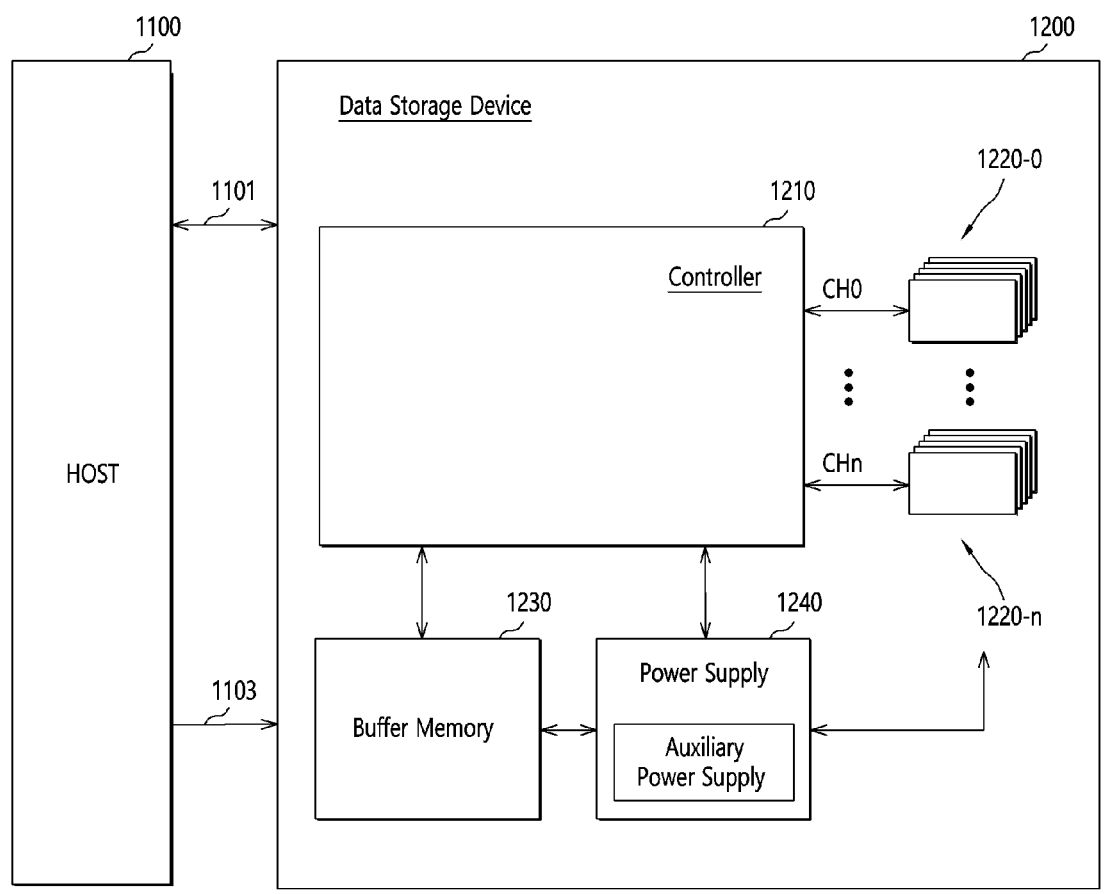
FIG. 7 is a diagram illustrating a data storage system in accordance with an embodiment of the present disclosure.

FIG. 7 is a diagram illustrating a data storage system 1000, in accordance with an embodiment of the present disclosure.

Referring to FIG. 7, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface unit, a control unit, a random access memory used as a working memory, an error correction code (ECC) unit, and a memory interface unit. In an embodiment, the controller 1210 may be configured as the controller 110 shown in FIGS. 1, 2 and 4.

The host device 1100 may exchange a signal with the data storage device 1200 through the signal connector 1101. The signal may include a command, an address, data, and so forth.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to one channel. The nonvolatile memory devices coupled to each channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be normally terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 8:
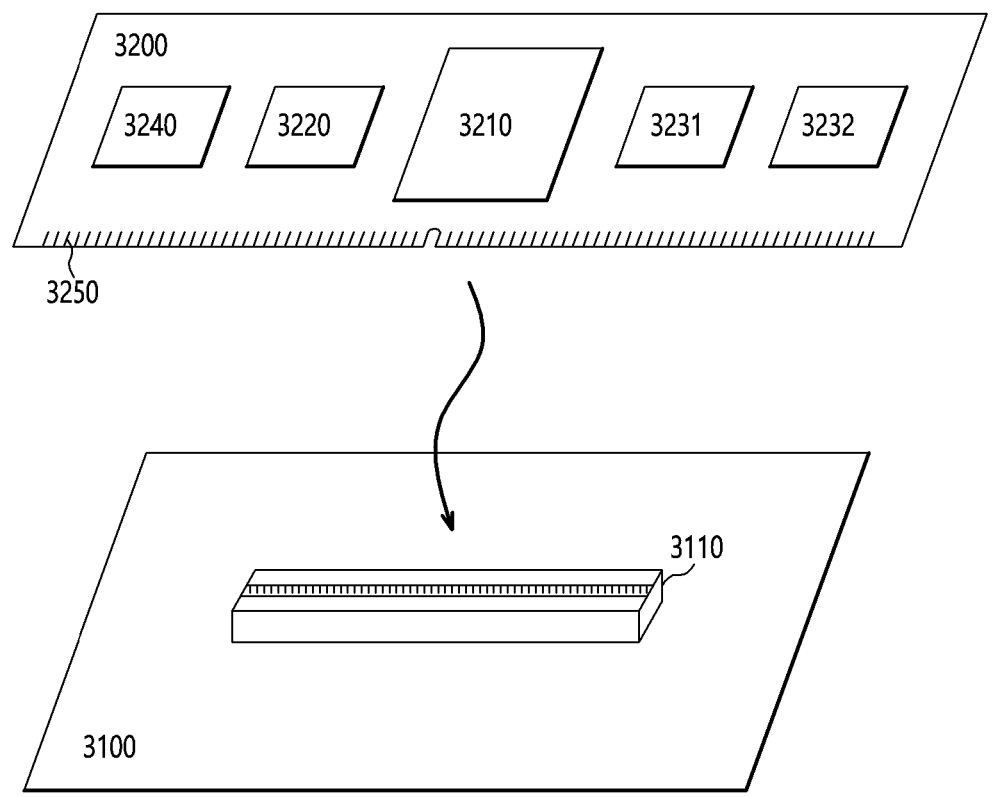
FIG. 8 and FIG. 9 are diagrams illustrating a data processing system in accordance with an embodiment of the present disclosure.

FIG. 8 is a diagram illustrating a data processing system 3000, in accordance with an embodiment of the present disclosure. Referring to FIG. 8, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1, 2 and 4.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and so forth, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 9:
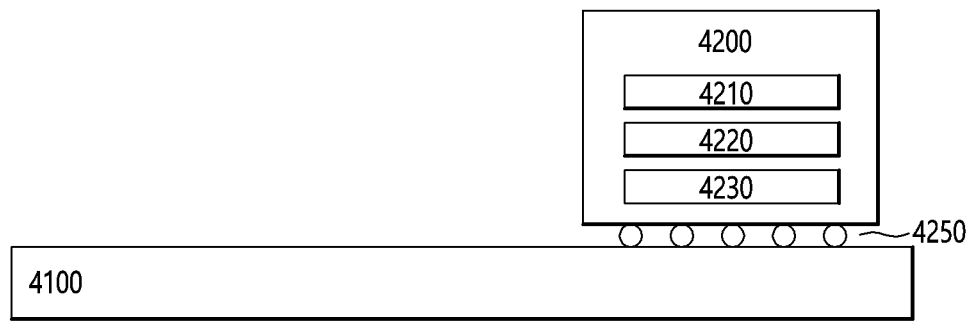

FIG. 9 is a diagram illustrating a data processing system 4000 in accordance with an embodiment of the present disclosure. Referring to FIG. 9, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1, 2 and 4.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 10:
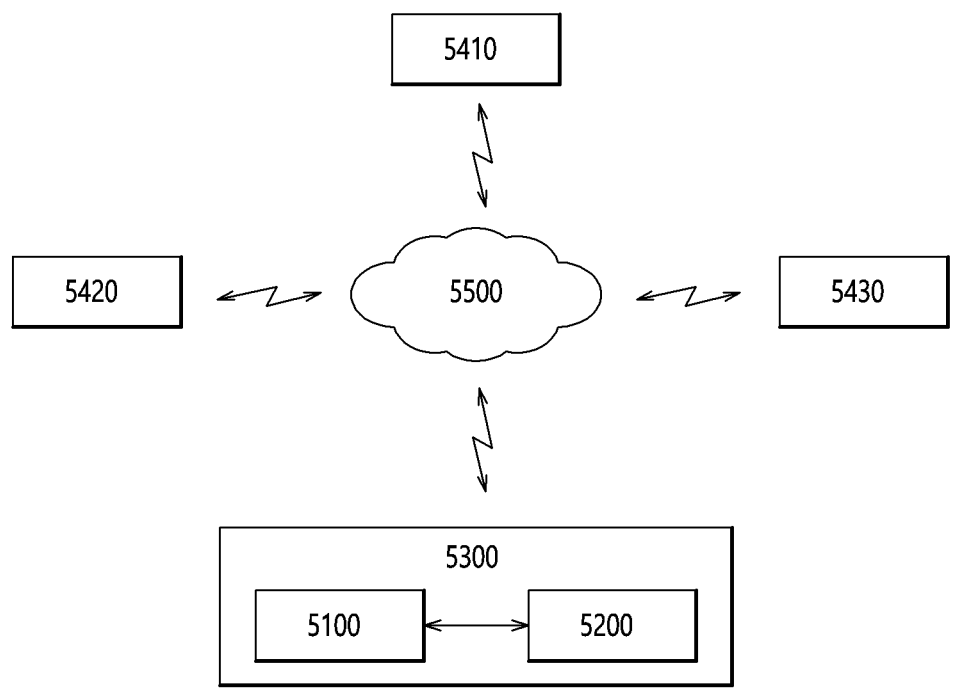
FIG. 10 is a diagram illustrating a network system including a data storage device in accordance with an embodiment of the present disclosure.

FIG. 10 is a diagram illustrating a network system 5000 including a data storage device, in accordance with an embodiment of the present disclosure. Referring to FIG. 10, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 7, the memory system 3200 shown in FIG. 8, or the memory system 4200 shown in FIG. 9.

Figure 11:
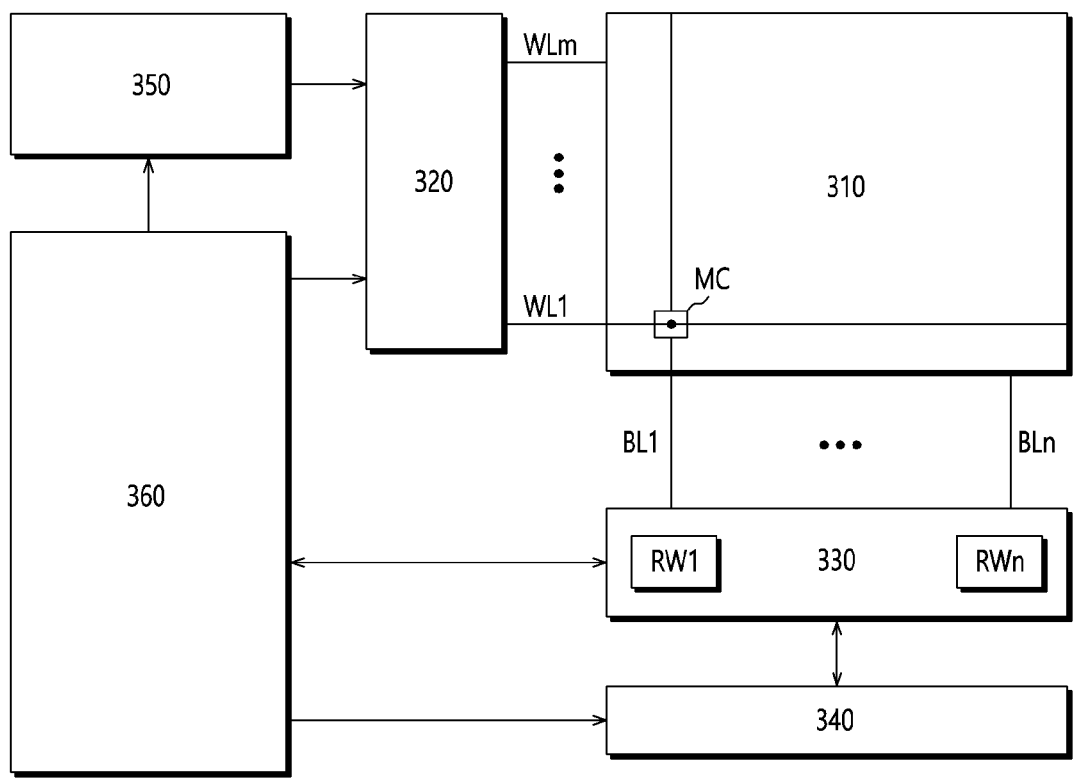
FIG. 11 is a block diagram illustrating a nonvolatile memory device included in a data storage device in accordance with an embodiment of the present disclosure.

FIG. 11 is a block diagram illustrating a nonvolatile memory device 300 included in a data storage device, such as the data storage device 10, in accordance with an embodiment of the present disclosure. Referring to FIG. 11, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The memory cell array 310 may comprise a three-dimensional memory array. The three-dimensional memory array, for example, has a stacked structure in a perpendicular direction to the flat surface of a semiconductor substrate. Moreover, the three-dimensional memory array means a structure including NAND strings which memory cells comprised of NAND strings which are stacked perpendicular to the flat surface of a semiconductor substrate.

The structure of the three-dimensional memory array is not limited to the embodiment indicated above. The memory array structure can be formed in a highly integrated manner with horizontal directionality as well as vertical directionality. In an embodiment, the NAND strings of the three-dimensional memory array memory cells can be arranged in the horizontal and vertical directions with respect to the surface of the semiconductor substrate. The memory cells may be variously spaced to provide different degrees of integration.

The row decoder 320 may be coupled with the memory cell array 310 through the word lines WL1 to WLm. The row decoder 320 may operate according to control of the control logic 360. The row decoder 320 may decode an address provided by an external device (not shown). The row decoder 320 may select and drive the word lines WL1 to WLm, based on a decoding result. For instance, the row decoder 320 may provide a word line voltage, provided by the voltage generator 350, to the word lines WL1 to WLm.

The data read/write block 330 may be coupled with the memory cell array 310 through the bit lines BL1 to BLn. The data read/write block 330 may include read/write circuits RW1 to RWn, respectively, corresponding to the bit lines BL1 to BLn. The data read/write block 330 may operate according to control of the control logic 360. The data read/write block 330 may operate as a write driver or a sense amplifier, according to an operation mode. For example, the data read/write block 330 may operate as a write driver, which stores data provided by the external device in the memory cell array 310 in a write operation. For another example, the data read/write block 330 may operate as a sense amplifier, which reads out data from the memory cell array 310 in a read operation.

The column decoder 340 may operate according to control of the control logic 360. The column decoder 340 may decode an address provided by the external device. The column decoder 340 may couple the read/write circuits RW1 to RWn of the data read/write block 330, respectively corresponding to the bit lines BL1 to BLn, with data input/output lines or data input/output buffers, based on a decoding result.

The voltage generator 350 may generate voltages to be used is in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided by the external device. For example, the control logic 360 may control operations of the nonvolatile memory device 300 such as read, write, and erase operations of the nonvolatile memory device 300.

While various embodiments have been described above, it will be understood to those skilled in the art that the embodiments described are examples only. Accordingly, the data storage apparatus and the operation method thereof, which are described herein, should not be limited based on the described embodiments and the following claims. Furthermore, the embodiments may be combined to form additional embodiments.

What is claimed is:

1. A data storage apparatus comprising:
a storage comprising a plurality of memory blocks; and
a controller configured to:
configure a write buffer pool by selecting a plurality of first memory blocks which are some of the plurality of memory blocks, and manage remaining memory blocks, except for the first memory blocks, as second memory blocks, exclude, from the buffer pool, one or more of the first memory blocks whose data are migrated to the second memory blocks and add one or more of the second memory blocks to the write buffer pool, and
in response to migrating the data from the one or more first memory blocks to the second memory blocks, substitute the one or more of the first memory blocks, in which the data become invalid due to the data being migrated to the second memory blocks, with free blocks among the second memory blocks.

2. The data storage apparatus according to claim 1, wherein the controller is further configured to store 1-bit data in each cell of the first memory blocks.

3. The data storage apparatus according to claim 1, wherein the controller is further configured to configure a user data region with at least some of the second memory blocks, and
wherein the second memory blocks constituting the user data region are configured to store 2 or more-bit data in each cell thereof.

4. The data storage apparatus according to claim 1, wherein a data storage speed of the first memory blocks is higher than that of the second memory blocks.

5. The data storage apparatus according to claim 1, wherein when it is checked that a capacity of the second memory blocks is equal to or less than a set threshold value, the controller is further configured to release a free block included in the write buffer pool,
wherein the released free block becomes part of the second memory blocks.

6. The data storage apparatus according to claim 1, wherein the controller is further configured to:
select, in response to a write request of a host device, one or more third memory blocks including, a first memory block pointed to by a first pointer, within the write buffer pool,
store write data in the selected one or more third memory block, and
change the first pointer to point to a next memory block in a free state within the write buffer pool.

7. The data storage apparatus according to claim 1, wherein as a migration event occurs, the controller is further configured to:
migrate, to the second memory blocks, data stored in one or more third memory blocks including a first memory block pointed to by a second pointer within the write buffer pool, and
change the second pointer to point to a next memory block, in which valid data is stored within the write buffer pool.

8. A data storage apparatus comprising:
a storage comprising a plurality of memory blocks; and
a controller configured to configure a write buffer pool by selecting a plurality of first memory blocks which are some of the plurality of memory blocks,
wherein the first memory blocks include at least one of a valid data block, an invalid data block and a free block, and
wherein the controller is further configured to manage the write buffer pool to keep a number of the first memory blocks, except for the invalid data blocks, at a target level by adding after generating the invalid data blocks and prior to erasing the invalid data blocks, free blocks to the write buffer pool, wherein a number of the free blocks equals a number of the generated invalid data blocks.

9. The data storage apparatus according to claim 8, wherein a data storage speed of the first memory blocks is higher than that of a user data region.

10. The data storage apparatus according to claim 8, wherein the controller is further configured to manage remaining memory blocks except for the first memory blocks as second memory blocks, wherein when it is checked that a capacity of the second memory blocks is equal to or less than a set threshold value, the controller is further configured to release a free block included in the write buffer pool, wherein the released free block becomes part of the second memory blocks.

11. The data storage apparatus according to claim 8, wherein the controller is further configured to:

select, in response to a write request of a host device, one or more third memory blocks including a first memory block pointed to by a first pointer, within the write buffer pool, store write data in the selected one or more third memory block, and change the first pointer to point to one free block within the write buffer pool.

12. The data storage apparatus according to claim 8, wherein the controller is further configured to manage remaining memory blocks except for the first memory blocks as second memory blocks, wherein as a migration event occurs, the controller is further configured to:

migrate, to the second memory blocks, data stored in one or more third memory blocks, including a first memory block pointed to by a second pointer within the write buffer pool, and change the second pointer to point to one valid data block within the write buffer pool.

13. An operation method of a data storage apparatus which includes a storage including a plurality of memory blocks and a controller configured to control the storage, the operation method comprising:

configuring, by the controller, a write buffer pool by selecting a plurality of first memory blocks which are some of the plurality of memory blocks;

managing, by the controller, remaining memory blocks, except for the first memory blocks as second memory blocks;

migrating, by the controller, data stored in one or more of the first memory blocks to one or more of the second memory blocks;

excluding from the write buffer pool, by the controller, the one or more of the first memory blocks and adding one or more of the second memory blocks to the write buffer pool, and in response to migrating the data from the one or more first memory blocks to the second memory blocks, substituting the one or more of the first memory blocks, in which the data become invalid due to the data being migrated to the second memory blocks, with free blocks among the second memory blocks.

14. The operation method according to claim 13, wherein the controller is configured to store 1-bit data in each cell of the first memory blocks.

15. The operation method according to claim 13, wherein the controller configures a user data region by using at least some of the second memory blocks, and stores 2 or more-bit data in each cell of the second memory blocks constituting the user data region.

16. The operation method according to claim 13, wherein a data storage speed of the first memory blocks is higher than that of a user data region.

17. The operation method according to claim 13, wherein when it is checked that the capacity of the second memory blocks is equal to or less than a set threshold value, the controller substitutes a free block included in the write buffer pool with the second memory blocks.

18. The operation method of claim 13, further comprising:

selecting, by the controller in response to a write request of a host device, one or more third memory blocks, including a first memory block pointed to by a first pointer, within the write buffer pool, storing, by the controller, write data in the selected one or more third memory block; and changing, by the controller, the first pointer to point to a next memory block, in a free state within the write buffer pool.

19. The operation method according to claim 13, wherein the migrating the data stored in the one or more first memory blocks to the one or more second memory blocks comprises:

migrating, to the second memory blocks, data stored in the one or more third memory blocks including a first memory block pointed to by a second pointer within the write buffer pool; and changing the second pointer to point to a next memory block, in which valid data is stored, within the write buffer pool.

\* \* \* \* \*